United States Patent [19]

Shirahama et al.

[11] Patent Number: 5,255,570
[45] Date of Patent: Oct. 26, 1993

[54] SAFETY SHIFT-LOCK DEVICE FOR SELECTOR OF AUTOMATIC POWER TRANSMISSION

[75] Inventors: Katsunori Shirahama; Masaharu Ishizuki, both of Kanagawa; Yoshimi Yamamoto, Shizuoka; Yasushi Asano, Shizuoka; Hiroshi Sakon, Shizuoka; Motohiro Saito, Shizuoka, all of Japan

[73] Assignees: Nissan Motor Company, Ltd.; Fuji Kiko Company, Ltd., Japan

[21] Appl. No.: 815,851

[22] Filed: Dec. 31, 1991

Related U.S. Application Data

[63] Continuation of Ser. No. 500,169, Mar. 28, 1990, abandoned.

[30] Foreign Application Priority Data

Mar. 31, 1989 [JP] Japan ................................. 1-80854
Mar. 31, 1989 [JP] Japan ................................. 1-80855

[51] Int. Cl.$^5$ ................... B60K 20/02; B60K 41/26
[52] U.S. Cl. .................................. 74/475; 74/483 R; 74/538; 152/4 A
[58] Field of Search ................ 192/4 R, 4 A, 4 C; 74/473 R, 473 P, 473 SW, 475, 483 R, 483 K, 538; 180/271; 70/245

[56] References Cited

U.S. PATENT DOCUMENTS

| | | | |
|---|---|---|---|
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,880,092 | 11/1989 | Kito et al. | 192/4 A |
| 4,884,668 | 12/1989 | Kobayashi et al. | 192/4 A |
| 4,905,802 | 3/1990 | Gotoh | 192/4 A |
| 4,909,096 | 3/1990 | Kobayashi | 192/4 A X |
| 4,930,609 | 6/1990 | Bois et al. | 192/4 A |
| 4,934,496 | 6/1990 | Barske et al. | 192/4 A |
| 4,936,431 | 6/1990 | Shinpo | 192/4 A |
| 4,938,042 | 7/1990 | Muramatsu | 192/4 A X |
| 4,942,937 | 7/1990 | Amberger et al. | 180/271 |
| 4,981,048 | 1/1991 | Kobayashi et al. | 74/483 R |
| 5,016,738 | 5/1991 | Shirahama et al. | 192/4 A |
| 5,025,901 | 6/1991 | Kito et al. | 192/4 A |
| 5,031,736 | 7/1991 | Kobayashi et al. | 192/4 A |
| 5,062,509 | 11/1991 | Carpenter et al. | 192/4 A |
| 5,150,593 | 9/1992 | Kobayashi et al. | 192/4 A X |

FOREIGN PATENT DOCUMENTS

| | | |
|---|---|---|
| 0246353 | 11/1987 | European Pat. Off. |
| 0300268 | 1/1989 | European Pat. Off. |
| 0307846 | 3/1989 | European Pat. Off. |
| 0378244A2 | 7/1990 | European Pat. Off. |
| 60-185750 | 12/1985 | Japan |

*Primary Examiner*—Richard M. Lorence
*Attorney, Agent, or Firm*—Lowe, Price, LeBlanc & Becker

[57] ABSTRACT

A shift-lock device has a locking member associated with a projection member to engage with the locking member for establishing locking engagement. One of the locking member and the projection member is rigidly connected to a selector of an automatic power transmission and the other is rigidly secured to a stationary member in the vehicular body. The locking member is normally and resiliently biased toward locking direction for establishing locking engagement with the projection member. The locking member is associated with a lock release actuator which is electrically operable and active for a predetermined period only when a predetermined safety condition is established.

5 Claims, 6 Drawing Sheets

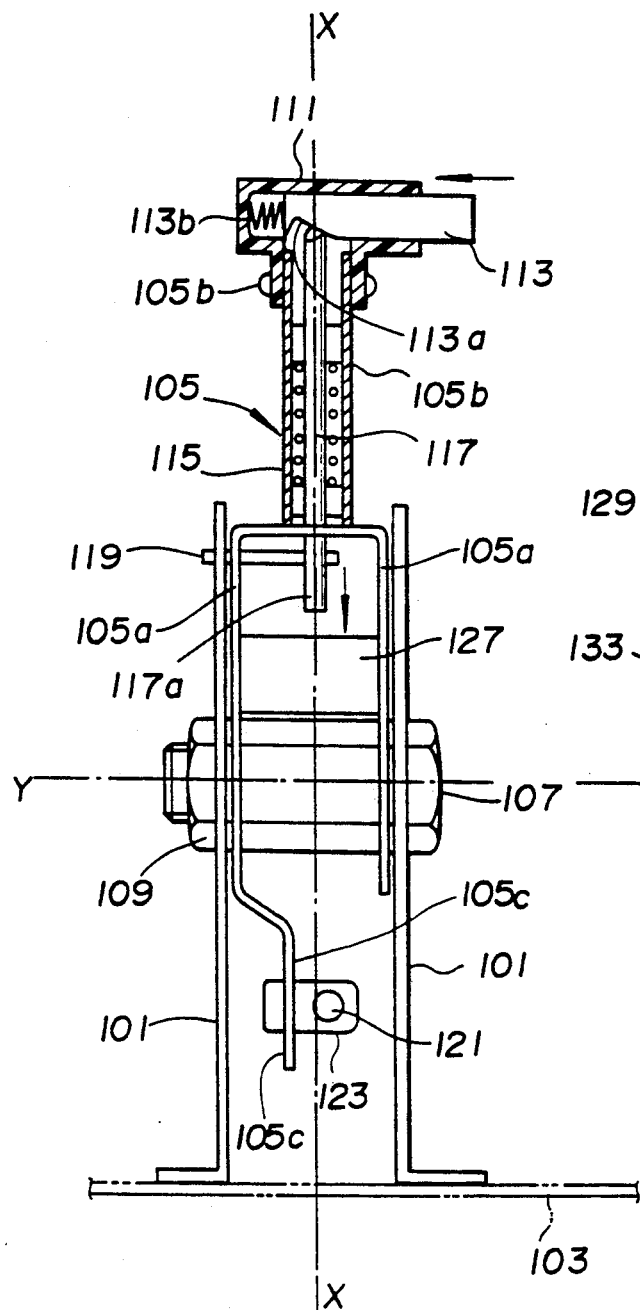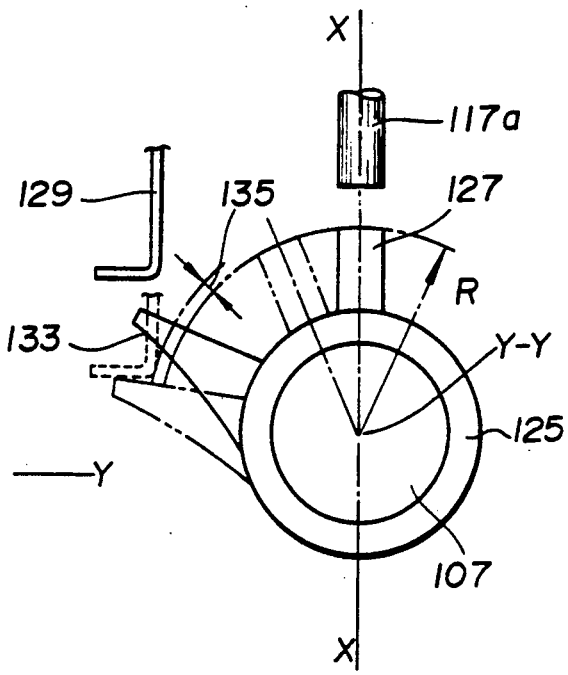

SAFETY SHIFT-LOCK DEVICE FOR SELECTOR OF AUTOMATIC POWER TRANSMISSION

This application is a continuation of application Ser. No. 07/500,169, filed Nov. 28, 1990, now abandoned.

BACKGROUND OF THE INVENTION

1. Field of the Invention

The present invention relates generally to a safety shift-lock device for an operational range selector of an automatic power transmission of an automotive vehicle, which locks the selector at a predetermined operational range position, e.g., P(park) position for disabling shifting of the selector unless a predetermined safety assuring condition is established.

2. Description of the Prior Art

In recent years, it has become popular to provide a safety shift-lock device for an operational range selector for an automotive automatic power transmission in order to prevent a vehicle from unexpected running upon unconsciously or carelessly shifting the selector from P range position from driving range position, such as D (automatic shift) range position, R (reverse) range position, 1 (first hold) range position, 2 (second hold) range position and so forth. Typically, such a safety shift-lock device is designed to establish shift-locking at P range position of the selector and permit to shift to other range position when an ignition switch is maintained at ON position and a foot brake is applied. This arrangement is successful in prevention of unexpected run of the vehicle upon starting up of the vehicle. Japanese Utility Model First (unexamined) Publication (Jikkai) Showa 60-185750 discloses a floor-shift type selector for the automatic power transmission, which selector is associated with a safety shift-lock device for locking the selector at the P range position.

In the shift-lock device proposed in the Japanese prior publication there is a problem or drawback in liability for a possibility of damaging actuator pin which is active for establishing shift-locking, when relatively great input force is exerted on the selector while the locking engagement is established. When the actuator pin is deformed by the externally applied operation force for the selector, the shift-lock tends to become inoperative, or in the worse case, shift-lock becomes impossible to release. For preventing damaging of the actuator pin, it becomes necessary to make the actuator pin thicker and stronger However, such increased size of actuator pin naturally leads increasing of the bulk size of a lock actuator resulting in higher production cost, greater weight and lesser freedom in orientation of the actuator.

SUMMARY OF THE INVENTION

Therefore, it is a principal object of the present invention to provide a safety shift-lock device which can reduce an externally exerted operational force to be exerted on a shiftlock mechanism so as to prevent an actuator pin from causing deformation even when an operational force is externally exerted.

Another object of the invention is to provide a shift-lock device which can maintain the shift-lock device at shift-locking state even when a main power supply therefor is shut down.

In order to accomplish these and other related objects, there is provided a shift-lock device which, according to the present invention, has a locking member associated with a projection member to engage with the locking member for establishing locking-engagement. One of the locking member and the projection member is rigidly connected to a selector of an automatic power transmission and the other is rigidly secured to a stationary member in the vehicular body. The locking member is normally and resiliently biased toward locking direction for establishing locking engagement with the projection member. The locking member is associated with a lock release actuator which is electrically operable and active for a predetermined period only when a predetermined safety condition is established.

According to one aspect of the invention, there is provided in combination with an automotive vehicle having a vehicle cabin, a steering column, a selector shaft extending through a mounting bracket which is secured to a dash panel and in parallel relationship with the steering column for a longitudinal movement along a predetermined axis and a rotational movement about the predetermined axis, and a manually operable selector lever connected to the selector shaft for shifting the selector shaft from a non-drive range position to a drive range position after a longitudinal movement of the selector shaft along the predetermined axis and the subsequent rotational movement of the selector shaft about the predetermined axis:

a stopper formed with the selector shaft;

a pivot mechanism mounted to the mounting bracket and including a pivot shaft crossing the predetermined axis generally at a right angle thereto, said pivot shaft having a first pivot axis;

a pivotable locking member including a board portion extending radially from said pivot shaft and formed with a locking mouth, said pivotable locking member being pivotably movable between a lock position wherein said locking mouth is in alignment with the path of said stopper and a lock releasing position wherein said locking mouth is out of alignment with the path of said stopper;

an actuator mounted to the mounting bracket and having an actuator housing and an actuation rod operatively connected to said pivotable locking member for actuating said pivotable locking member between said lock position and said lock releasing position, a lock release lever pivotably mounted to said actuator housing for a pivotable movement about a second pivot axis lying generally in parallel to said first pivot axis;

a lock release button mounted within the vehicle cabin;

mechanical means for connecting said lock release button to said lock release lever to cause a pivotable movement of said lock release lever upon manipulation of said lock release button; and means for converting said pivotable movement of said lock release lever into a movement of said pivotable locking member toward said lock releasing position.

The actuator may be trigger in response to said detector means detecting establishment of said predetermined safety condition and turned into inactive state upon expiration of a predetermined period of time. The safety lock mechanism may lock said selector assembly at said specific range position which corresponds to a parking range position of the automatic power transmission. The detector means may detect engine running state and application of a foot brake to detect establishment of said predetermined safety condition.

The safety lock mechanism may comprise a projection projected from a shaft portion of said selector and a pivotal locking member oriented in the vicinity of said shaft portion of said selector for locking engagement with said projection at said specific range position for preventing said selector from being operated to axially and/or circumferentially offset position from said specific range position. The shaft portion of said selector extends essentially in parallel to a steering column so as to place a steering handle in the vicinity of a steering wheel. The locking member may be pivotably supported on a stationary member of a vehicular body member in such an orientation that it mates with said projection only at said specific range position of said selector. The lock member is associated with said actuator so that it is biased toward the locking position when said actuator is not active and is biased toward lock releasing position when said actuator is active.

The safety shift-lock device may further comprise a position plate associated with said selector assembly for stopping said selector at selected operational range position, said position plate defining a patterned opening having a plurality of recesses, and said selector assembly has a selector position locking member engageable with said patterned opening for locking said selector assembly at various range positions and a position lock releasing member for operating said selector position locking member for releasing locking engagement with one of said recesses. The locking mechanism may be associated with said position lock releasing release position for disabling operation of the latter at said specific range position of said selector. The position lock releasing member is movable in an axial direction for shifting said selector position locking member away from said recesses, and said lock mechanism is so oriented to mae with the end of said selector position locking member for preventing axial movement of said position lock releasing member. The safety shift-lock device may further comprise a manually operable means associated with said locking member, for permitting manual operation from said locking position to said lock releasing position.

The present invention will be understood more fully from the detailed description given herebelow and from the accompanying drawings of the preferred embodiments of the invention, which, however, should not be taken to limit the invention to the specific embodiments but are for explanation and understanding only.

BRIEF DESCRIPTION OF THE DRAWING

FIG. 9 is a partially sectional front elevation of the selector of FIG. 8; and

FIG. 10 is an illustration showing co-relation between a bushing and a lock release lever in the second embodiment of the shift-lock device.

DETAILED DESCRIPTION OF THE PREFERRED EMBODIMENTS

Figure 1:
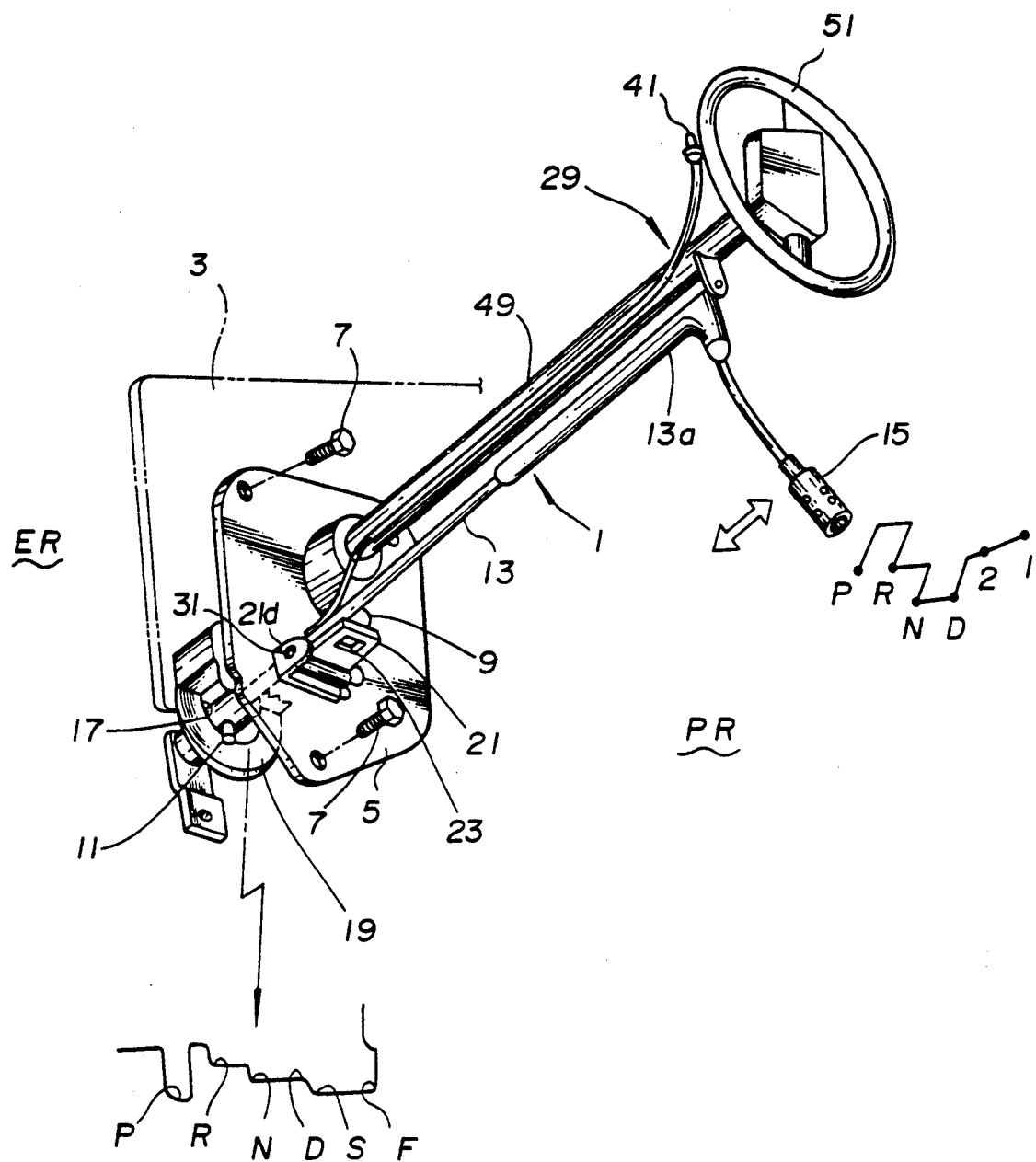
FIG. 1 is a perspective view of a column-shift type selector assembly for an automatic power transmission, for which the first embodiment of a safety shift-lock device according to the present invention, is applied.

Referring now to the drawings, particularly to FIGS. 1 through 7, the first embodiment of a safety shift-lock device, according to the present invention, is applicable for a column-shift type selector 1. The selector 1 includes a selector shaft 13 extending through a mounting bracket 5 which is secured onto a vehicular body member, such as dash panel 3, by means of fastening bolts 7. The selector shaft 13 is formed with a stopper 9 at an orientation adjacent of the mounting bracket 5 within an interior space of a vehicular cabin PR. The selector shaft 13 is also formed with a selecting lever 11 at an orientation adjacent the mounting bracket 5 and the exterior ER of the vehicular cabin. A selector lever 15 is integrally formed with the selector shaft 13 for pivotal or rotational movement and axial movement about an axis X-X (best seen in FIGS. 2–7) in selection of the transmission operational ranges. The upper portion 13a of the selector shaft 13, at which the selector shaft adjoins with the selector lever 15, is supported on a steering column shaft for rotation with a steering wheel 51.

A position plate 19 is provided in the vicinity of the mounting bracket 5 and defines the shift pattern of the selector lever 15 as exemplified in FIG. 1. As seen, in the shown embodiment, the selector lever 15 is operable over P range position, R range position, N (neutral) range position, D range position, 2 range position and 1 range position for selecting an operational range of the automatic power transmission. The position plate 19 is cooperative with the selecting lever 11 to maintain the selector shaft 13 at an angular position corresponding to the selected operational range of the transmission.

Figure 2:
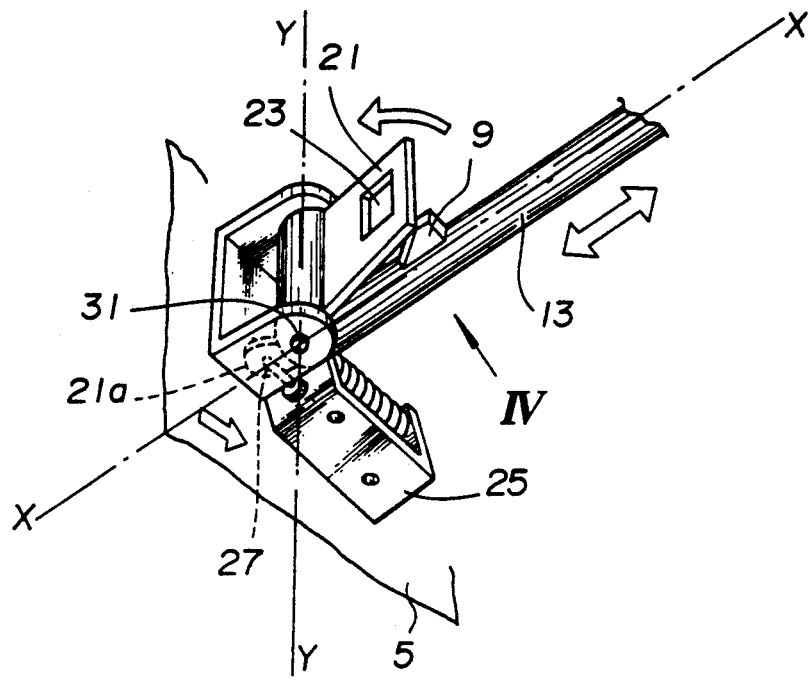
FIG. 2 is an enlarged perspective view of the major portion of the first embodiment of the shift lock device of FIG. 1, which illustrates unlocking state of the shift-lock device.
Figure 3:
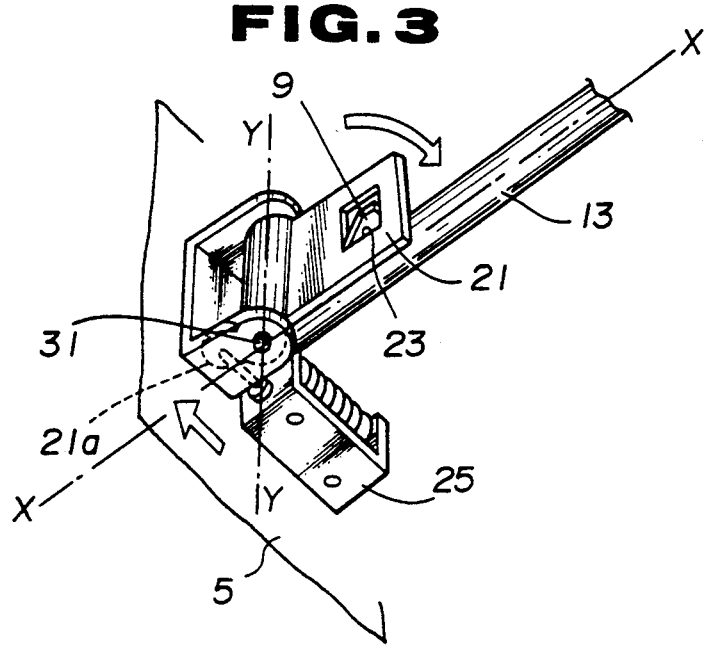
FIG. 3 is a similar view of FIG. 2 but showing the shift-lock device at a shift-locking state.

On the other hand, the stopper 9 is cooperative with a pivotal locking member 21 which is pivotably mounted on the mounting bracket 5 via a pivot mechanism 21d for pivotal movement about a pivot shaft 31 which has an axis Y-Y which crosses axis X-X generally at a right angle thereto. See FIGS. 2–7. The pivotal locking lever 21 is formed with a locking mouth 23. The locking mouth 23 is oriented so as to oppose the stopper 9 at the axial and angular position of the selector shaft 13 corresponding to P range position, so that shift-locking engagement with the stopper is established only when the selector 1 is placed at the P range position. The pivotal locking member 21 has an extension 21a. (See FIG. 2). The extension 21a is connected to an actuation rod 27 of an electromagnetic actuator 25, such as a solenoid. The actuator 25 is normally maintained in a deenergized state to push the associated extension 21a of the locking member 21 in a clockwise direction in FIGS. 2 and 3 for forcing the locking member 21 toward the locking position. Therefore, when the selector 1 is shifted at P range position to place the stopper 9 at a position corresponding to the locking mouth 23, the locking member 21 enters into locking engagement with stopper 9 for preventing the selector shaft 13 from rotating and from axially shifting, as shown in FIG. 3. On the other hand, the actuator 25 is responsive to a predetermined safety assurance condition of the vehicle to be triggered for pulling on the extension 21a for causing pivotal motion of the locking member 21 in a counterclockwise direction toward a lock releasing position, for permitting rotational and axial movement of the selector shaft 13 from the P range position, as shown in FIG. 2. In the shown embodiment per FIGS. 1-7, a condition of the ON position of the ignition switch and applied position of a foot brake is required to satisfy the predetermined safety assurance condition. Furthermore, in the shown embodiment, the period to maintain the actuator 25 at the energized state is limited for a predetermined period of time starting from establishing of the predetermined safety assurance condition. The locking member 21 is further associated with a manually operable lock releasing mechanism including a lock release button 41. This lock releasing mechanism is designed to cause counterclockwise pivotal movement of the locking member 21 in response to a manual operation of the lock release button 41.

Figure 7:
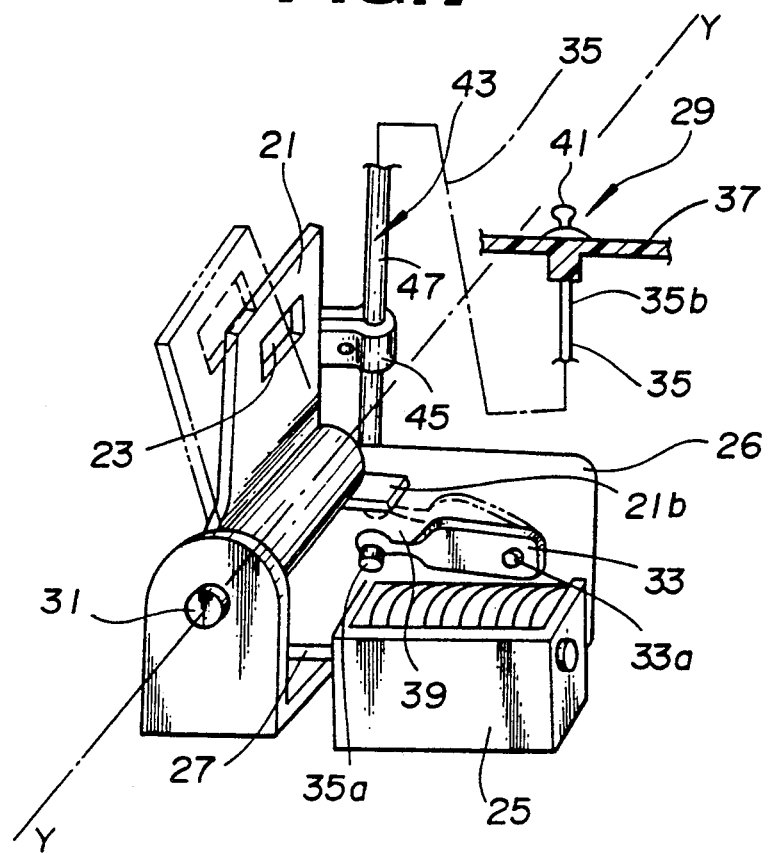
FIG. 7 is a perspective view of a lock release actuator employed in the first embodiment of the safety shift-lock device of FIG. 2.

As shown in FIG. 7, the lock release mechanism comprises an extension tang 21b for pivotal movement with the locking member 21. A lock release lever 33 is provided in the vicinity of the extension tang 21b for cooperation therewith. The lock release lever 33 is pivotably supported on a side plate 26 of an actuator housing for pivotal movement about a pivot pin 33a. s can be seen from FIG. 7, the lock release lever 33 has a twisted end section 39 extending substantially perpendicular to the major section. A wire 35 is provided for connecting the lock release button 41 to the lock release lever 33. The wire 35 is supported essentially in parallel relationship with the steering column 49 by means of one or more guide brackets 45. As can be seen, in the shown embodiment, the end 35a of the wire 35 is connected to the free end of the twisted end section 39. On the other hand, the lock release button 41 is mounted on a steering column cover 37 to permit access from the inside of the vehicular cabin PR.

In order to manually release the shift lock, the lock release button 41 is pulled for causing pivotal movement of the lock release lever 33 in clockwise direction as illustrated by the broken line in FIG. 7. The lock release lever 33 as driven to pivotally move in clockwise direction causes contact with the extension tang 21b for forcing the latter to pivot in counterclockwise direction toward the lock release position against the force of the solenoid. Therefore, by pulling the lock release button 41, the shift lock can be manually released.

Assuming that the vehicle is maintained in its parking state by placing the selector 1 at P range position and that the vehicle is to be started to run, the actuator 25 is maintained in its deenergized position until the condition of ON state of the ignition switch and applied state of the brake is established. Namely, even when the ignition switch is operated to ON position to run the engine, the actuator 25 is maintained in its deenergized state if the foot brake is not applied. Therefore, if the driver attempts to shift the selector 1 to a position other than P range position, the interengagement of the locking member 21 and the stopper 9 prevents rotational and axial motion of the selector shaft 13. By this, shifting operation for selecting other than P range is prevented.

Figure 4:
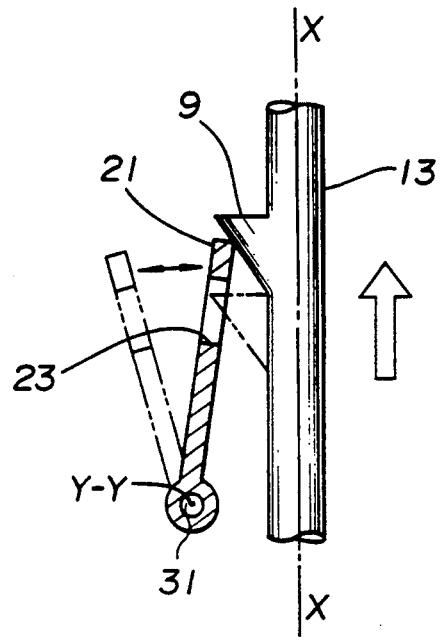
FIG. 4 is a further enlarged sectional view of the first embodiment of the shift-lock device and showing the state at which the selector is axially shifted for shifting.
Figure 5:
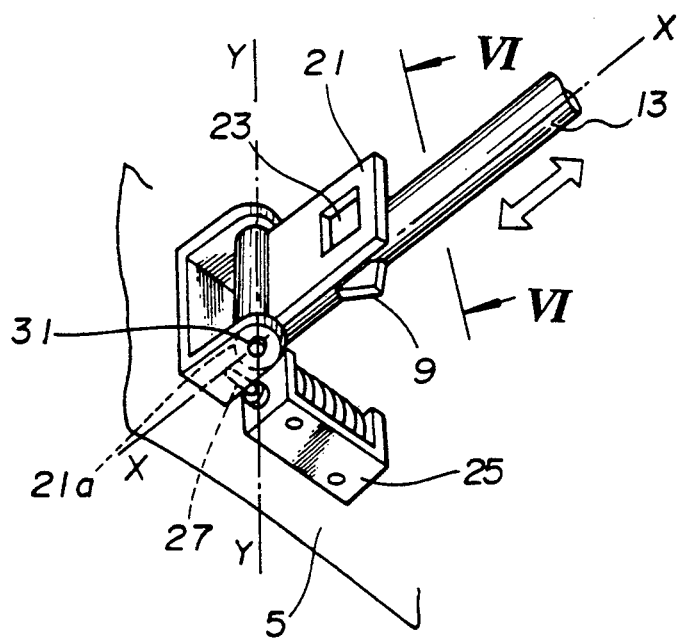
FIG. 5 is a perspective view similar to FIG. 2, but showing the selector shifted from P range position to other range positions.
Figure 6:
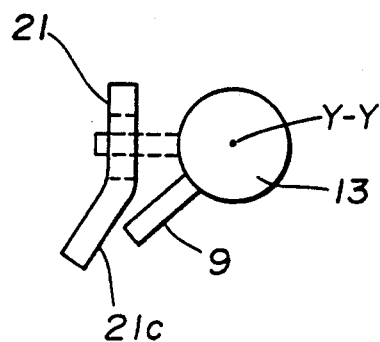
FIG. 6 is a fragmentary section taken along line VI—VI of FIG. 5.

When the foot brake is applied while the engine is held running, the actuator 25 is energized for the predetermined period to shift the locking member 21 to the lock release position. Therefore, within the predetermined period, the selector shaft 13 is maintained free from locking and thus can be operated to the position other than P range position. If the selection 1 is operated during the predetermined period to select the operational range position other than P range position, the position of the stopper 9 offset from the orientation of the locking mouth 23 of the locking lever as shown in FIGS. 4 and 5. Therefore, establishment of locking engagement will never occur until the selector is again shifted to P range position.

Figure 8:
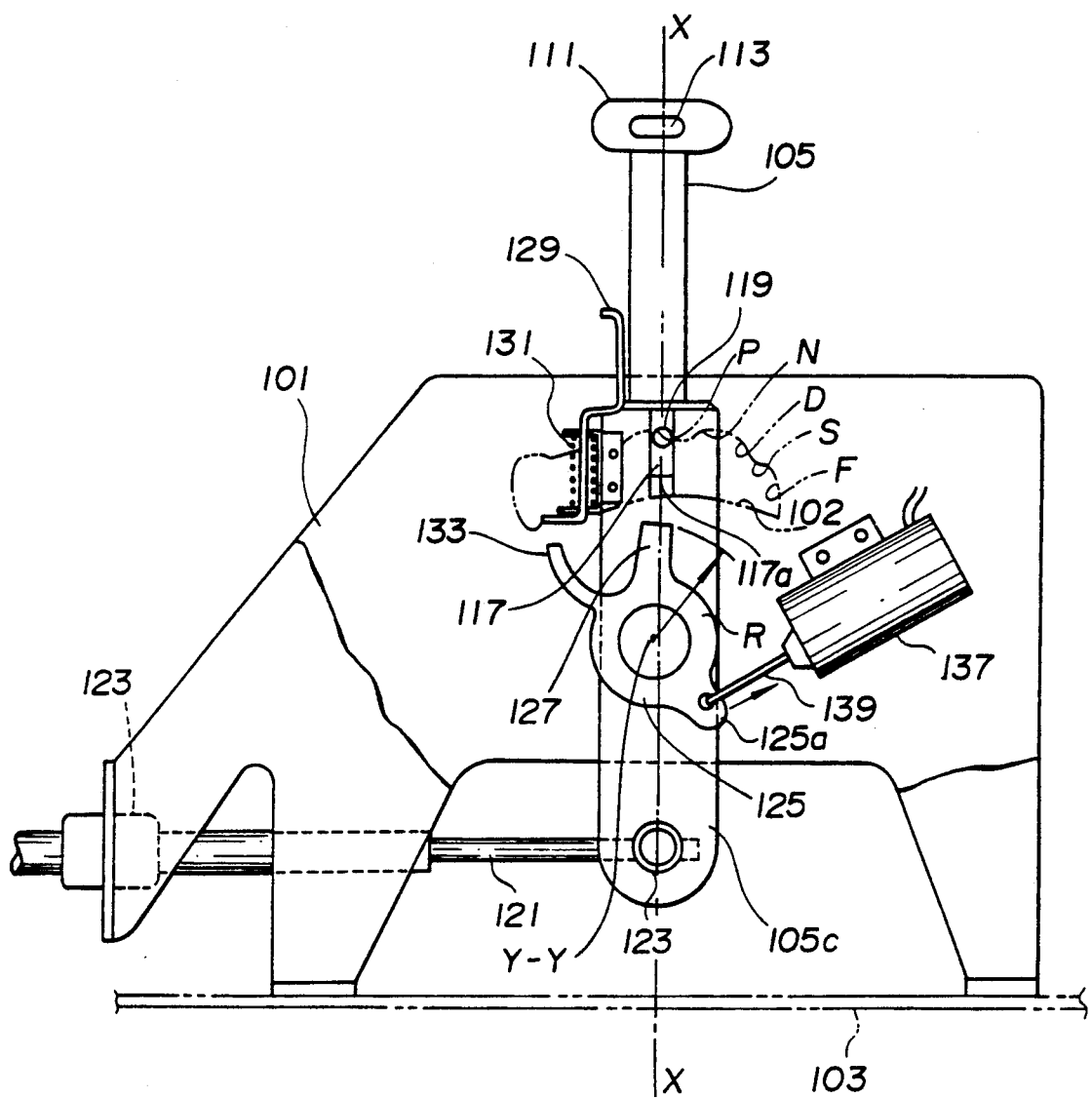
FIG. 8 is a side elevation of a floor-shift type selector for an automatic power transmission, for which the second embodiment of a safety shift-lock device according to the invention is applied.

FIGS. 8 through 10 show another embodiment of the shift lock device according to the present invention, which is applied for a floor-shift type selector of the automatic power transmission.

In the floor-shift type selector, a pair of position plates 101 defining a shift pattern of a selector 105. As can be seen from FIG. 9, the position plates 101 are arranged in symmetrical relationship to each other. Similarly to the former embodiment, the selector 105 is shiftable over P range position, R range position, N range position, D range position, 2 range position and 1 range position. The selector lever 105 is provided bifurcated leg portions 105a which are pivotably secured on the position plates 101 by means of bolt 107 and nut 109. A cylindrical upper section 105b of the selector 105 extends upwardly from the bifurcated leg portions 105a. A selector knob 111 is mounted at the top of the cylindrical upper section 105b of selector 105. A compression rod 117 extends through the hollow space of the cylindrical portion 105b of the selector 105 and can be reciprocated along axis X-X as best seen in FIGS. 8-10. The compression rod 117 is normally biased upwardly by means of a return spring 115. The compression rod 117 carries a position pin 119 which engages with a patterned opening 102 defined in one of the position plates 101. The patterned opening 102 has a plurality of recesses separated by intermediate lands. The recesses define respective shift position of the selector and thus correspond to respective operational range positions.

A selector knob button 113 is provided for thrusting movement with respect to the selector knob 111. The selector knob button 113 is formed with a tapered portion 113a in which the top end of the compression rod 117 is normally oriented. See FIG. 9. For this, a spring 113b is provided for resiliently biasing the selector knob button 113 is that the tapered portion 113a normally mate with the top end of the compression rod 117. At this condition, the position pin 119 is secured within one of the recessed of the patterned opening 102 for locking the selector 105 at the selected operation range position. As can be seen, between the 1 range position and the 2 range position and between the N range position and D range position, the land separating the recesses are smaller or not provided so that locking engagement between the position pin and the patterned opening will not occur. The locking engagement between the position pin 119 and the patterned opening 102 can be released by depressing the selector knob button 113 to depress the compression rod 117 downwardly.

An operation cable 121 is connected to the lower end of one of the leg 105a to connect the selector 105 to a speed ratio shifting mechanism in the automatic power transmission. See FIG. 9. Though the shown embodiment employs the cable 121 for mechanical connection between the selector 105 and the speed ratio shifting mechanism in the automatic power transmission, it may be possible to replace the cable 121 with a known control rod. The cable 121 extends through a grommet 123 supported on the axial end of the position plate 101.

A safety lock lever 125 is provided for pivotal movement about the bolt 107, which has an axis Y-Y as best seen in FIGS. 8–10, according to pivotal movement of the selector 105 in synchronism therewith. The safety lock lever 125 has a locking arm 127 integrally formed therewith. The safety lock lever 125 is formed of a synthetic resin. The safety locking lever 125 is so designated to be placed at an angular position to place the locking arm 127 at a position mating with the lower end of the (compression rod 117 for preventing the latter from downwardly shifting. The safety lock lever 125 is connected to an actuation rod 139 of an actuator 137 at an extension 125a which is extended from the major portion of the safety lock lever 125 and oriented essentially at symmetrical position to the locking arm 127.

Similarly to the foregoing embodiment, the actuator 137 is normally maintained at deenergized position to place the locking lever at the shown position so that the locking arm 127 may prevent the downward movement of the compression rod at P range position of the selector 105. On the other hand when the ignition switch is ON and the foot brake is applied, the actuator 137 is energized for a predetermined period for causing counterclockwise rotation in FIG. 8 of the locking lever 125 to permit downward movement of the compression rod 117 and whereby permitting the selector 105 to be shifted from P range position to other operational range position.

The locking lever 125 also has a lock releasing leg 133. The upper end of the lock releasing leg 133 is placed to mate with the lower end of a manually operable lock release member 129 which is normally biased in a direction away from the lock releasing leg 133 by means of a spring 131, at P range position of the selector 105. With this construction, when the lock release member 129 is manually depressed, the lower end thereof comes into contact with the lock releasing leg 133 to cause the counterclockwise rotation in FIG. 8 to release safety shift lock.

As can be appreciated herefrom, similarly to the foregoing embodiment, the actuator employed in the shown embodiment is energized only when the safety assurance condition is established and for a predetermined period of time.

Therefore, in either embodiment, fatigue of the actuator may not be promoted at unacceptably high speed. Therefore, the safety shift lock system becomes reliable for a satisfactorily long period.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

We claim:

1. In combination with an automotive vehicle having a vehicle cabin, a steering column, a selector shaft extending through a mounting bracket which is secured to a dash panel and in parallel relationship with the steering column for a longitudinal movement along a predetermined axis and a rotational movement about the predetermined axis, and a manually operable selector lever connected to the selector shaft for shifting the selector shaft from a non-drive range position to a drive range position after a longitudinal movement of the selector shaft along the predetermined axis and the subsequent rotational movement of the selector shaft about the predetermined axis:

a stopper formed with the selector shaft;

a pivot mechanism mounted to the mounting bracket and including a pivot shaft crossing the predetermined axis generally at a right angle thereto, said pivot shaft having a first pivot axis;

a pivotable locking member including a board portion extending radially from said pivot shaft and formed with a locking mouth, said pivotable locking member being pivotably movable between a lock position wherein said locking mouth is in alignment with the path of said stopper and a lock releasing position wherein said locking mouth is out of alignment with the path of said stopper;

an actuator mounted to the mounting bracket and having an actuator housing and an actuation rod operatively connected to said pivotable locking member for actuating said pivotable locking member between said lock position and said lock releasing position, a lock release lever pivotably mounted to said actuator housing for a pivotable movement about a second pivot axis lying generally in parallel to said first pivot axis;

a lock release button mounted within the vehicle cabin; mechanical means for connecting said lock release button to said lock release lever to cause a pivotable movement of said lock release lever upon manipulation of said lock release button; and means for converting said pivotable movement of said lock release lever into a movement of said pivotable locking member toward said lock releasing position.

2. The combination as claimed in claim 1, wherein: said converting means include an extension tongue integral with said pivotable locking member, said extension tongue being arranged to cooperate with said lock release lever to rotate said pivotable locking member during said pivotable movement of said lock release lever.

3. The combination as claimed in claim 2, wherein: said mechanical means include a wire having one end connected to said lock release lever and an opposite end connected to said lock release button.

4. The combination as claimed in claim 3, wherein: said actuator includes a solenoid.

5. In combination with an automotive vehicle having a vehicle cabin, a position plate mounted within the vehicle cabin, a floor-shift type selector mounted to the position plate for a pivotable movement about a pivot axis and having a cylindrical section, a selector knob mounted to the cylindrical section of the selector for shifting the selector from a non-drive range position to a drive range position, a selector knob button within the selector knob and formed with a tapered portion, a compression rod, within the cylindrical section, biased toward the selector knob button and having one end for engagement with the tapered portion and an opposite end, and pin and opening means for holding the selector in the non-drive range position until the compression rod moves in a predetermined axis upon depression of the selector knob;

a safety lock lever pivotable about a pivot axis crossing said predetermined axis generally at a right angle thereto, said safety lock lever having a radially extending locking arm and a lock releasing leg, said safety lock lever being pivotably movable between a lock position wherein said locking arm is in alignment with the path of said opposite end of said compression rod when the selector is placed in the non-drive range position and a lock releasing position wherein said locking arm is out of alignment with the path of said opposite end of said compression rod;

an actuator having an actuation rod operatively connected to said safety lock lever for actuating said safety lock lever between said lock position and said lock releasing position; and a manually operable lock release member constructed and arranged to cooperate with said safety lock lever such that when said lock release member is manually depressed, said lock release member comes into contact with said lock releasing leg when said selector is placed at the non-drive range position, causing said safety lock lever to pivot to said lock releasing position.

* * * * *